United States Patent [19]

Poli

[11] Patent Number: 4,975,901
[45] Date of Patent: Dec. 4, 1990

[54] NETWORK FOR MESSAGE SWITCHING BETWEEN A PLURALITY OF PROCESSING UNITS

[75] Inventor: Roberto Poli, Milan, Italy

[73] Assignee: Italtel Societa Italiana, Milan, Italy

[21] Appl. No.: 272,772

[22] PCT Filed: Dec. 12, 1986

[86] PCT No.: PCT/EP86/00785
§ 371 Date: Sep. 2, 1988
§ 102(e) Date: Sep. 2, 1988

[87] PCT Pub. No.: WO87/05459
PCT Pub. Date: Sep. 11, 1987

[30] Foreign Application Priority Data

Mar. 5, 1986 [IT] Italy .................. 19639 A/86

[51] Int. Cl.$^5$ ............................ H04Q 11/04
[52] U.S. Cl. .................................. 370/58.1
[58] Field of Search .............. 370/58.1, 58.2, 58.3, 370/60, 60.1

[56] References Cited

U.S. PATENT DOCUMENTS 4,592,045 5/1986 Fundneider ..................... 370/58
4,835,766 5/1989 Arutaki et al. .................. 370/58
4,839,888 6/1989 Baltz et al. ..................... 370/58

OTHER PUBLICATIONS

"UT100/60—An Electronic Digital Family of Exchanges for Large Capacity Applications".

Primary Examiner—Douglas W. Olms
Assistant Examiner—Alpus H. Hsu

[57] ABSTRACT

A network for switching messages between a plurality of processing units, each of the processing units being connected to a transmission channel. The network includes a plurality of input interface devices which can memorize a plurality of messages and furthermore is also adapted to output and access requests onto a common bus. When one of the input interface apparatuses receives a consent signal, it outputs a message onto the bus. This message is memorized by the output interface devices with an indicator that coincides with one specified in a predetermined byte of the message. In addition, a scanning apparatus is provided for forwarding address bits to a multiplexing device.

9 Claims, 5 Drawing Sheets fig.1 fig.2 fig.3 fig.4 fig.5 fig.6

NETWORK FOR MESSAGE SWITCHING BETWEEN A PLURALITY OF PROCESSING UNITS

TECHNICAL FIELD OF THE INVENTION

This invention relates to a network for message switching, in a particularly fast manner, between a plurality of processing units. To each of the processing units there is connected a serial transmission channel.

In the following description the switching network will be illustrated with reference to a switched digital type telephone exchange. Each processing unit is encased in its respective module of the exchange and the messages are constituted by signal messages. However, the network may be advantageously used for switching messages between any type of processing unit complex.

BACKGROUND OF THE INVENTION

Modern digital type telephone exchanges, of the type suitable to switch vocal and/or data signals in the form of PCM signals (Pulse Code Modulation), are usually designed to include the presence of a plurality of input-/output modules, to each of which a predetermined number of users and/or a predetermined number of trunk lines can be connected. Each of the modules includes a processing unit for analysing the signalling criteria associated to voice and/or data signals, and also to structure them in the form of messages which can be switched between the modules.

It is known, in modern digital switched exchanges, switching operations concerning vocal and/or digital signals are carried out by means of a connection network on the basis of indications contained in the signal messages.

The connection network includes switching modules which in turn also include a processing unit.

Switching operations of signal messages can be carried out by using predetermined channels of the connection network, or by means of a switching network that is separate from the connection network. However it must be kept in mind that use of the connection network for switching signal messages involves the introduction of time delays necessary for crossing the network which are fundamentally caused by the times required to carry out connection network pre-patterning operations. In some circumstances the crossing times, mentioned above, are not compatible with the times required for correct operation of the switched exchange.

The fact, must also be kept in mind, that realization of a signal message switching network that is separate from the connection network, makes it possible to avoid the above described inconveniency concerning the transit times of messages, but also involves overcoming certain technical problems such as the following:

(a) switching messages with a number of words (bytes) that differs from message to message;

(b) switching messages which are output from the single modules in a non cyclic manner and according to a rhythm (the number of messages in a time unit) which differs from module to module, thus avoiding the danger of losing messages;

(c) synchronize the output module and the destination module with each other;

(d) allow a generic message to be sent to a single destination module, as also to a group of modules or to all the modules;

(e) guarantee scanning of all modules in a predetermined time interval;

(f) carry out useful functions for diagnosis of the switched message network and of the organs linked up to it.

One purpose of the present invention is to realize a fast switching network of the signal messages, that is separated from the connection network, and has the aforementioned requisites.

Such a switching network has been described, for example, by Bovo et al in the article "UT 100/60—An electronic digitale family of exchanges for a large capacity Applications" Proceeding of ISS 1/84—Florence, Italy; Session 14 B, pages 5; page 5, left-hand) with particular reference to FIG. 5 et al.

Figure 5:
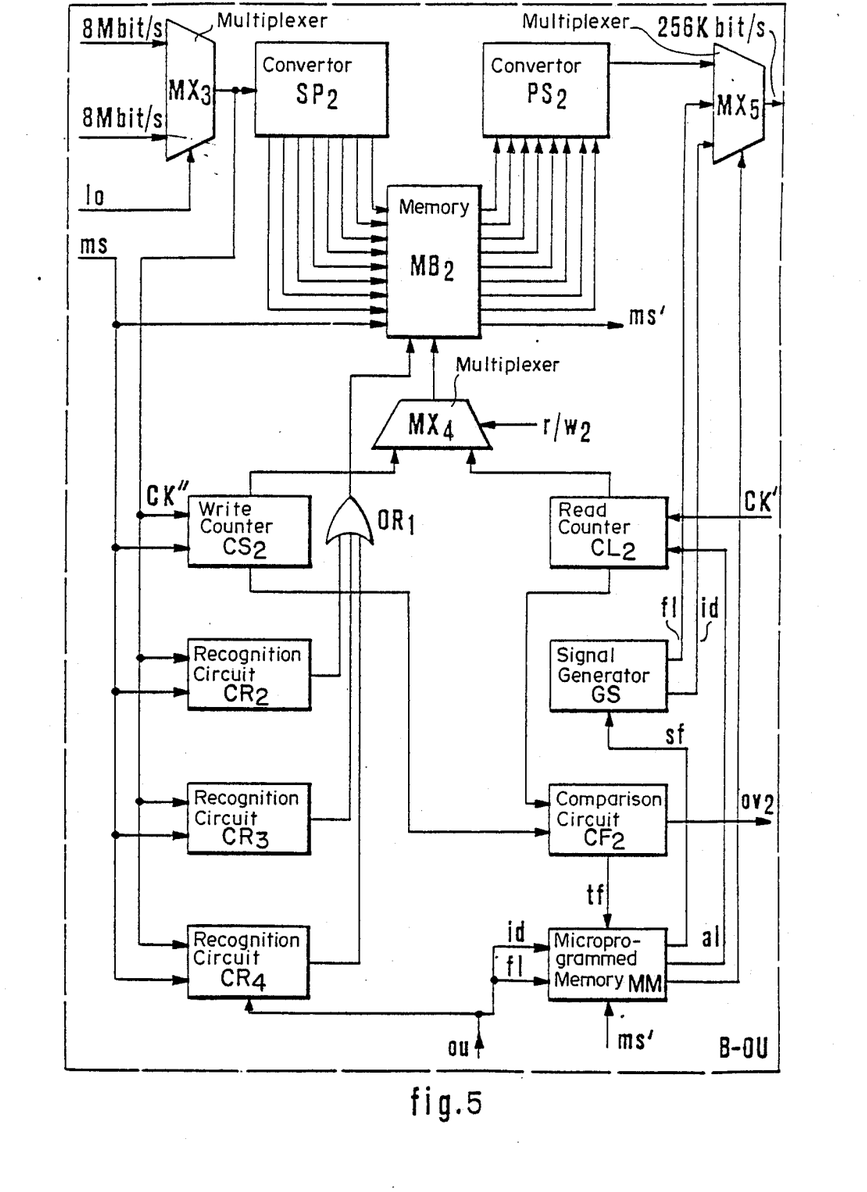
FIG. 5 illustrates in detail one of the output interface units (B-OU) shown in FIG. 3.

FIG. 5 of the Bovo article shows a message distributor module block diagram where the message distributor network, connected to N external Module Processors, comprises (connected one another) N input interfaces R, multiplexing means driven by a control logic and N output interfaces R.

Therefore an object of the present invention is a network for switching messages between a plurality h of processing unity, comprising h input interface units; multiplexing means driven by scanning means, whose inputs are connected to the outputs of the input interface units, and h output interface units whose inputs are connected, in parallel one another, to the output of the multiplexing means.

The above network for carrying out an object of the invention includes the following:

each interface unit is designed to be connected to a channel output from its respective processing unit, to memorize a plurality of messages, to activate a first output after memorizing at least one message, to make an active signal available on a second output for the complete duration of a message excepting during its last byte, to output a message on a third output in reply to receiving an enabling signal;

the multiplexing means receive the first, second and third output of the said input interface units on their input, and to connect the same to their own first, second and third output on the basis of the address bits applied to their own monitoring inputs;

the scanning means, designed to forward the said address bits to the multiplexing means to stop, or begin scanning operations again, in reply to picking up the enabling of the first output, or alternatively in reply to picking up the disenabling of the second output, of the multiplexing means;

decoding means, receiving on their input said address bits, designed to provide the said input interface units with enabling signals;

h output interface units, each of which can be connected to an channel entering its respective processing unit, and receive the messages corresponding to the third output of the multiplexing means and also designed to memorize them if the indicator present in a predetermined byte of the message coincides with the indicator assigned to said units.

Further objects of the invention will be made clear by the description given henceforth which refers to a form of embodiment given purely as an example without intending to limit the scope of the invention in any way, and completed with the attached drawings in which:

DETAILED DESCRIPTION

Figure 1:
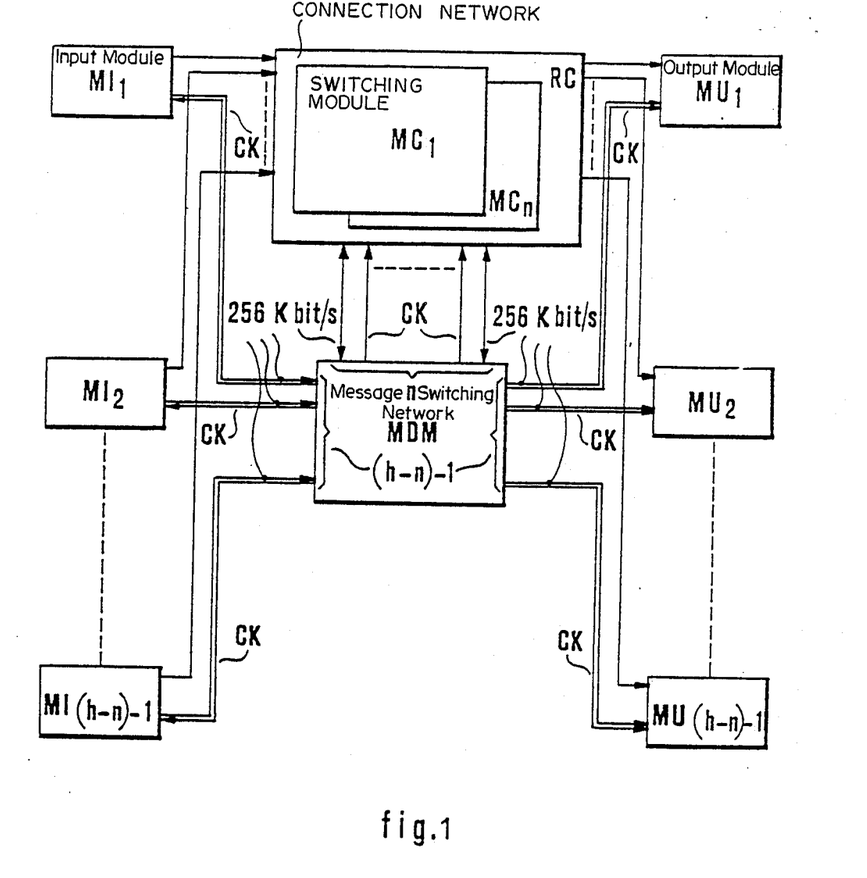
FIG. 1 shows the block diagram of a digital type switched exchange with a message switching network (MDM) made according to the invention.

In FIG. 1, the block diagram of a digital type switched telephone exchange which uses the message switching network MDM for switching signal messages is illustrated. The voice and/or data signals are on the other hand switched by a connection network, RC, which, in a preferred form of embodiment, is of the type comprising n levels of switching, wherein each level is constituted by its respective switching module $MC_1, \ldots, MC_n$.

The MDM network constructed according to the present invention is ideal for switching the messages which are input into it by means of h 256 Kbit/s serial transmission channels, onto the same number of output channels.

As shown FIG. 1, it can be seen that n of the h channels of the MDM unit are connected to the same number of switching modules MC of the connection network RC, one channel is used by a supervisor module embodied in the MDM unit itself (see FIG. 3), and the remaining (h−n) −1 channels are connected to the same number of input output modules MI, MU of the switched exchange. In particular, the input modules MI send the voice (and/or data) signals, that is to say the signal messages, to the output modules MU, by means of the connection network RC, or by means of the message switching network MDM. Therefore, the MI modules can pre-process the signalling criteria concerning the users (and/or junction lines) connected to them and organize it in message form, and said messages will then be output onto their respective serial transmission channel, which in a preferred form of embodiment has a speed of 256 Kbit/s.

Transmission and receive operations both the input-output modules and the switching modules, are clocked by the MDM unit which forwards a clock signal CK to each module by means of its own respective wire. For reasons of clarity, the MI modules have been drawn separate from the MU modules in the figs. In actual fact, there is always both an MI module and its corresponding MU module positioned on the same plate so a single wire provides the clock signal both for the input module and its corresponding output module.

Figure 2:
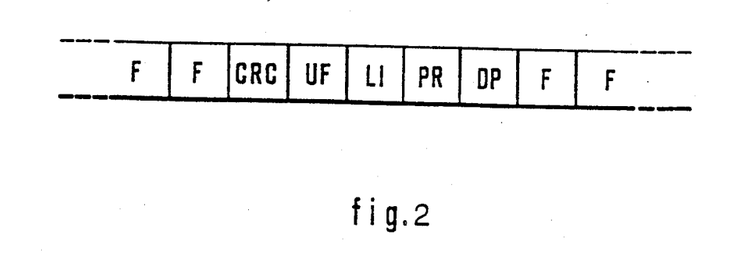
FIG. 2 shows the structure of a signal message.

The format of the messages that are received by the MDM unit is illustrated in FIG. 2. It must be borne in mind that as long as there is no request to transmit the messages a flag F (signal word) with a predetermined pattern is sent onto the above mentioned channel. The first byte of the message is the destination point DP indicator, followed by further information such as the priority code PR, and the length indicator LI, the user field UF and the CRC code which constitutes the cyclic redundancy code through which any errors introduced by the transmission medium can be picked up. On the basis of the indicator specified in the DP field, the MDM unit forwards each message onto the respective 256 Kbit/s transmission channel connected to the module (MU or MC or MS) that constitutes the message's destination.

Figure 3:
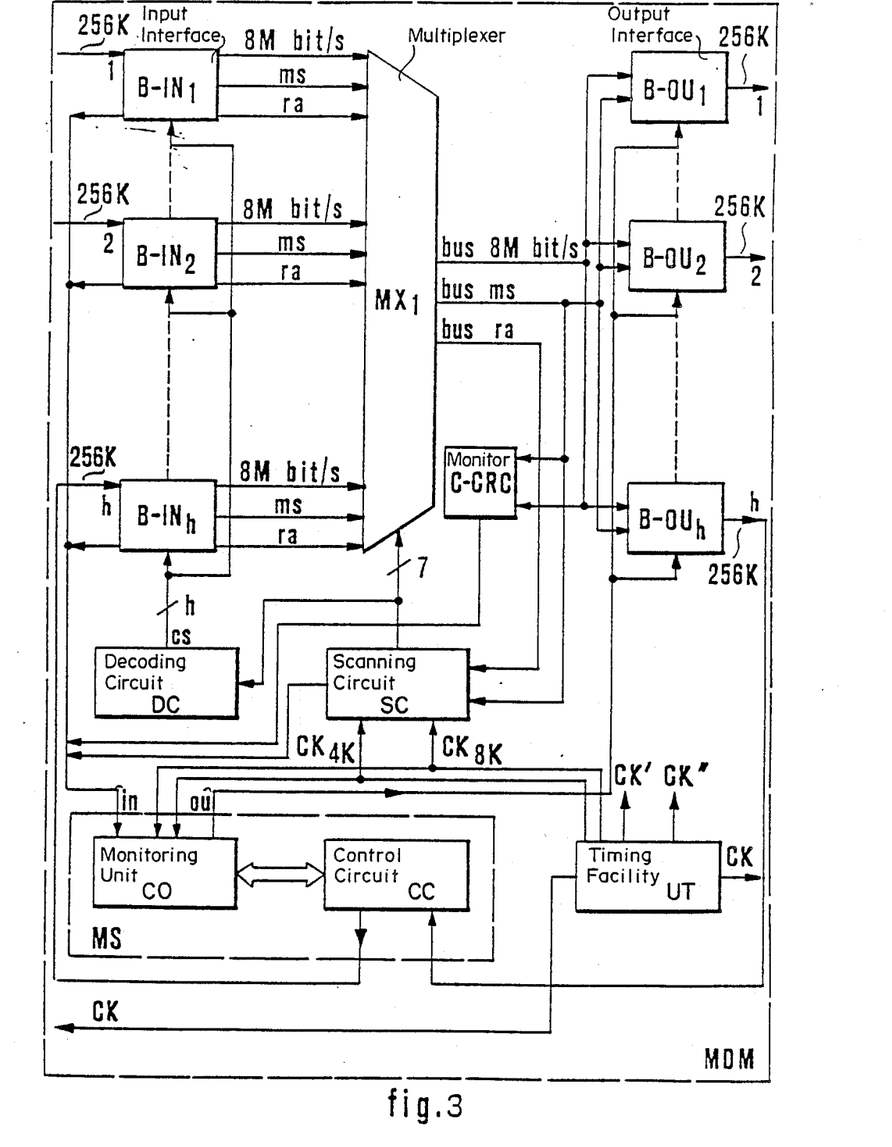
FIG. 3 shows the block diagram of the message switching network (MDM) in FIG. 1.

FIG. 3 illustrates the block diagram of the MDM unit shown in FIG. 1 and which includes the presence of a plurality h, input interface units $B\text{-}IN_1, \ldots, B\text{-}IN_h$, connected to their respective 256 Kbit/s serial transmission channels.

In particular, the channels output from the respective switching modules $MC_1, \ldots, MC_n$ are connected to the interfaces $B\text{-}IN_1, \ldots, B\text{-}IN_n$, the supervision module MS are connected to the $B\text{-}IN_h$ interfaces, and the input modules $MI_{(h-n)-1}$ are connected to the remaining interfaces $B\text{-}IN_{(h-n)-1}$.

Each of the said B-IN interfaces has been designed to:
memorize a plurality of messages;
activate an output ra when at least one message is present in its internal memory, thus outputting an access request to a common bus;
output a message when it receives a consent signal cs at a speed V less than K. h (where said parameters assume for example the following values: K=256, h=128, V=8 Mbit/s);
output an active signal on an output ms for the whole of the duration of the outputting of the message on the 8 Mbit/s transmission channel, excepting only during the last byte of the message when said signal shall be deactivated.

The outputs of each B-IN unit are sent onto the respective inputs of a multiplexer $MX_1$ the output of which corresponds therefore to an 8 Mbit/s bus, to an access request bus ra and to a message in course bus ms. The latter two buses reach a scanning circuit, SC, the function of which is to cyclically scan all the B-IN units—modifying in a sequential manner the addresses applied onto the monitoring input of $MX_1$—and to stop the scanning whenever it reveals the presence of an access request on the ra bus.

The addresses available on the output of the SC unit are also input into a decoding circuit, DC, the h outputs of which correspond to the consent signals cs for determining the outputting of a message by the B-IN unit in question during that phase of the scanning operations.

When the signal on the ms bus is deactivated (last byte of the message), a one step increase is registered in the SC unit, which in this manner begins scanning of the B-IN units once again.

There are h output interface units $B\text{-}OU_1, \ldots, B\text{-}OU_h$ connected to the 8 Mbit/s bus which have suitable circuits for analysing the DP field of the messages which are input to them and which are likewise designed to enable memorization of the same if the DP field coincides with the indicator associated to each B-OU unit.

Similarly, to the B-IN interfaces, the $B\text{-}OU_1, \ldots, B\text{-}OU_n$ interfaces are connected to the $MC_1, \ldots, MC_n$ modules. The $B\text{-}OU_h$ interfaces are connected to the supervision module MS, while the remaining $B\text{-}OU_{(h-n)-1}$ interfaces are connected to the output modules MU.

From the aforegoing description the manner in which the switching operations are carried out can easily be seen. In fact a message coming from any single B-IN unit can be forwarded to any buffer B-OU unit after transiting on the 8 Mbit/s bus. The messages are then sent, by means of a 256 Kbit/s channel, to the output module to which they are directed, or alternatively to the connection network RC, or to the supervisor module MS. The supervisor module MS comprises a monitoring unit CO and a control circuit CC. The CO unit is for receiving signals from each of the input interface units B-IN, from the scanner SC, and from a unit C-CRC—designed to monitor the cyclic redundancy code CRC—that indicate their condition, and is also used for memorizing the state that said units should have in the absence of abnormal operating conditions, and will also compare the signals received with those memorized. If any lack of identity is found, the CO unit generates an interrupt request directed to the control circuit CC, implemented for example with a commercial type microprocessor; in response to this, the latter unit sets off a procedure for pointing out the unit to which the abnormal condition refers and for starting consequent actions such as for example determining the forwarding, by means of the CO unit, of predetermined signals to the B-OU units, as will be made more clear henceforth with reference to FIG. 5.

The CC unit uses the couple of interface units B-IN$_h$ and B-OU$_h$ connected to it for switching messages with any input-output module MI-MU or alternatively with any switching module MC. This switching of messages is necessary for example to carry out program loading operations in the processing units in the above mentioned modules, in order to carry out cyclic monitoring, etc.

The monitoring circuit of the cyclic redundancy code, C-CRC, is connected to the 8 mbit/s bus as well as to the ms bus and its function is to analyze the CRC field of the messages (see FIG. 3) which transit along the 8 Mbit/s bus in order to pick up the presence of any errors introduced during the switching operations. In the presence of an error the C-CRC unit activates its own output and said activation is picked up by the CO unit of the supervisor module which, on the basis of the address available on the output of the scanner SC, picks up the indicator of the B-IN unit to which the abnormality causing the error picked up is to be attributed. The MDM unit also includes the presence of timing means UT, constructed to supply a clock signal CK both to the modules and to its own inner organs (CO, SC, etc.), which permits synchronization of the switching operations of the signal messages.

Figure 4:
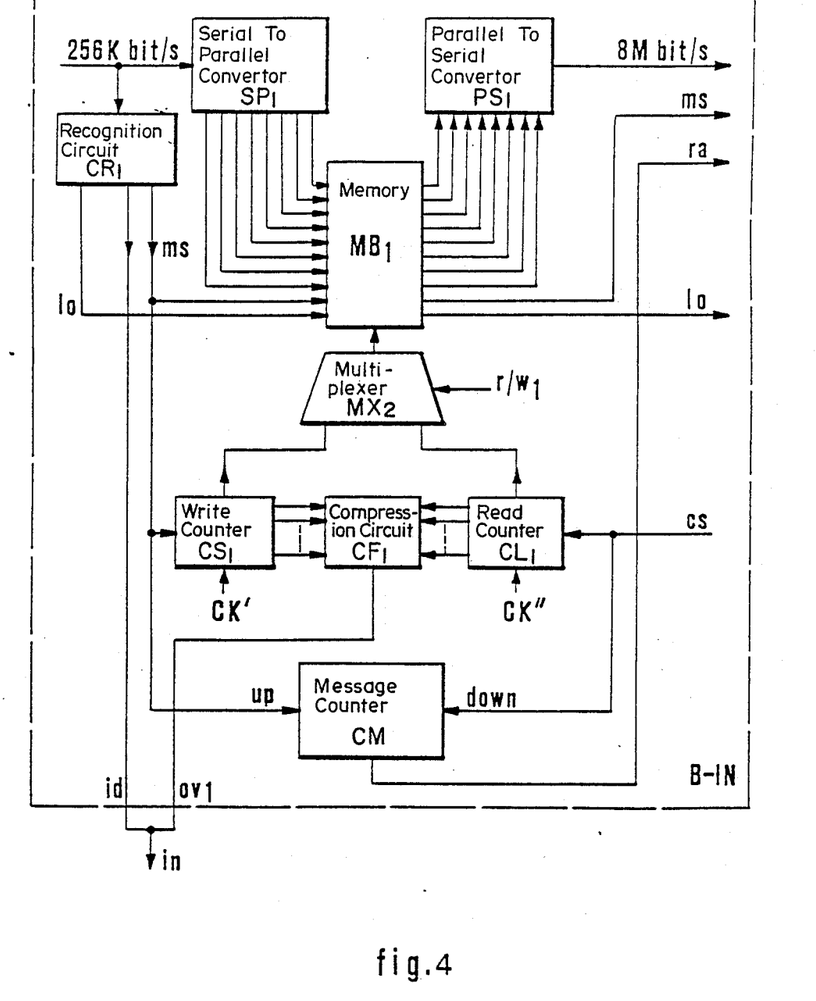
FIG. 4 illustrates in detail one of the input interface units, B-IN, shown in FIG. 3, in detail.

One of the input interface unit B-IN is illustrated in detail in FIG. 4. Included in FIG. 4 is a first recognition circuit CR$_1$ of predetermined binary patterns transmitting on the relevant 256 Kbit/s serial channel. In particular they include the presence of circuits for recognizing the pattern of a loop control lo, the pattern indicating idle state id on the transmission medium, and for making the said signal ms available.

The 256 Kbit/s channel is also input into a serial-to-parallel converter SP$_1$ the outputs of which are forwarded to the same number of inputs of a buffer memory MB$_1$ designed to memorize a predetermined number of messages. The outputs of the MB$_1$ buffer are input to a parallel-to-serial converter PS$_1$ the output of which is corresponded by an 8 Mbit/s transmission channel.

The writing and reading addresses of the MB$_1$ buffer are respectively supplied to a write counter CS$_1$ and a read counter CL$_1$ by means of a multiplexer MX$_2$. Said operations are in fact carried out in time division at the rhythm (e.g. 500 n.secs.) defined by a signal r/w$_1$ supplied by timing circuits (not shown).

The B-IN unit also includes the presence of a message counter CM and a first comparison circuit CF$_1$ designed to output an overflow alarm signal ov$_1$ when the number of messages memorized in the MB$_1$ buffer exceeds a predetermined fraction of the total memorizing capacity. When the ms signal (indicating the presence of a message in the 256 Kbit/s channel) exists on the output of the recognition circuit CR$_1$, the counter SC$_1$ is enabled to start counting; this latter unit receives a signal CK' on its count input which has a frequency that is eight times less than that of the 256 Kbit/s serial channel, thus determining the counting of the bytes of the message and therefore enabling memorizing operations in the MB$_1$ buffer.

When the ms signal assumes logical value zero (last byte of the message) a one step increase is registered in the message counter CM, which activates its own ra output, thus showing in this manner that there is at least one message ready to be transmitted present in the MB$_1$ buffer. When the scanner SC (FIG. 3) picks up the said access request and outputs the said consent signal cs, the CL$_1$ unit is actuated for counting, and a clock signal CK'' that has a frequency eight times lower than the speed of the data being output from the PS$_1$ unit is input into the said CL$_1$ unit. The cs signal is also forwarded onto the counting input at the back of the message counter CM which, after reading of one message, decreases its own contents by one step.

In order to avoid the scanner remaining associated to a generic B-IN unit in whose MB$_1$ buffer there are for example a large number of messages memorized, with the consequent stopping of scanning operations for a noticeable time interval, the B-IN units are designed to output only one message at a time. This makes it possible to guarantee scanning of all the B-IN units in a predetermined time interval, but can give rise to a possible state of accumulation of messages (overflow). For this purpose the presence of the said CF$_1$ unit has been included, which is designed in such a manner as to activate the output ov$_1$ when the content of the CS$_1$ unit differs from the content of the CL$_1$ by a predetermined entity.

Activation of the id and/or ov$_1$ signals is therefore an indication of the existence of an abnormal state either on the transmission medium or in the MB$_1$ memory respectively; said signals are forwarded to the monitoring unit CO (see FIG. 3) by means of the said wire in.

FIG. 5 shows in detail one of the output interface units B-OU of FIG. 3. This unit includes the presence of a multiplexer MX$_3$, to one input of which the aforementioned 8 Mbit/s bus is connected, while on its other input there is the 8 Mbit/s transmission channel which—in a specific form of an embodiment—corresponds to the output of the B-IN unit associated to the B-OU unit in question. The MX$_3$ unit receives the bit lo on its monitoring input; said bit is available on the output of the MB$_1$ memory (see FIG. 4), and if active, connects the output of the 8 Mbit/s transmission channel to MX$_3$, thus determining a loop connection of a B-OU unit and a B-IN unit.

If the lo bit is not active, the MX$_3$ unit determines transiting of the messages present on the 8 Mbit/s bus and these are examined by a plurality of recognition circuits CR$_2$, CR$_3$, and CR$_4$. In particular, the CR$_2$ unit is designed in such a manner as to activate its own output if the DP field of the message which corresponds to the output of MX$_3$ coincides with an address wired on the CR$_2$ unit itself. On the other hand, the CR$_3$ and CR$_4$ circuits' function is to permit forwarding of the same message,—for example for maintenance purposes,—to all the B-OU units or to a predetermined group of the B-OU units respectively. For this purpose the $CR_4$ circuit receives the indicator of the message destined to be sent to a predetermined group of modules from the monitoring circuit CO by means of said wire ou, and if the indicator coincides with the one specified in the message's DP field, excitation of the relevant output is registered. On the other hand, forwarding of a message to all the modules is carried out by wiring a predetermined address on all the $CR_3$ units and sending a message along the 8 Mbit/s bus wherein the DP field coincides with the aforementioned address.

A logical sum circuit $OR_1$ is connected to the outputs of the $CR_2$, $CR_3$ and $CR_4$ units, which activates its own output if in at least one of the units described above, comparison operations have given positive results. When this latter condition happens, enabling of a buffer memory $MB_2$ is registered, which receives on its data input, the output of a serial-to-parallel converter $SP_2$ which is connected to the output of $MX_3$, and on its address input the outputs of a multiplexer $MX_4$. The outputs of a write counter $CS_2$ and a read counter $CL_2$ are input into this latter multiplexer and it is monitored by a signal $r/w_2$ which determines the alternance of write and read operations according to a predetermined cycle (e.g. 500 n.secs.).

The $CS_2$ unit is actuated by the ms signal and receives the clock signal CK'' on its count input, while the $CL_2$ unit is actuated by a signal al supplied by a microprogrammed unit MM. This latter unit is monitored by the signal ms', available on the output of the $MB_2$ unit, which enables reading operations for the whole duration of a message and is also monitored by the CO unit in FIG. 3 (ou wire).

Similarly there is a second comparison circuit $CF_2$ associated to the $CS_2$ and $CL_2$ units which activates a first output $ov_2$ or alternatively a second output tf, when the contents of the $CS_2$ unit differ by a predetermined entity from the contents of the $CL_2$ unit (overflow state), or alternatively when a state of coincidence is registered; this latter state indicates the fact that all the messages present in the $CL_2$ unit have been transmitted.

In consideration of the fact that the protocol which regulates the sending of messages being output from the B-OU units requires the outputting of a predetermined number of flags between two consecutive messages, in reply to picking up the flag transmission signal tf being output from $CF_2$ the MM memory synchronizes a signal generator GS and modifies the monitoring signal of a multiplexer $MX_5$. This latter unit receives the output of the $PS_2$ unit on one of its inputs, and on a second and third input, typical patterns of said flag signal fl and typical patterns of said id signal (idle), respectively. Therefore sending of the fl signal by the GS unit is synchronized by the MM unit by means of outputting a flag start signal sf. In particular the MM unit is piloted by the said $CF_2$ unit (and consequently the said buffer memory $MB_2$) under normal operating conditions, or by the said CO unit under particular operating conditions.

Figure 6:
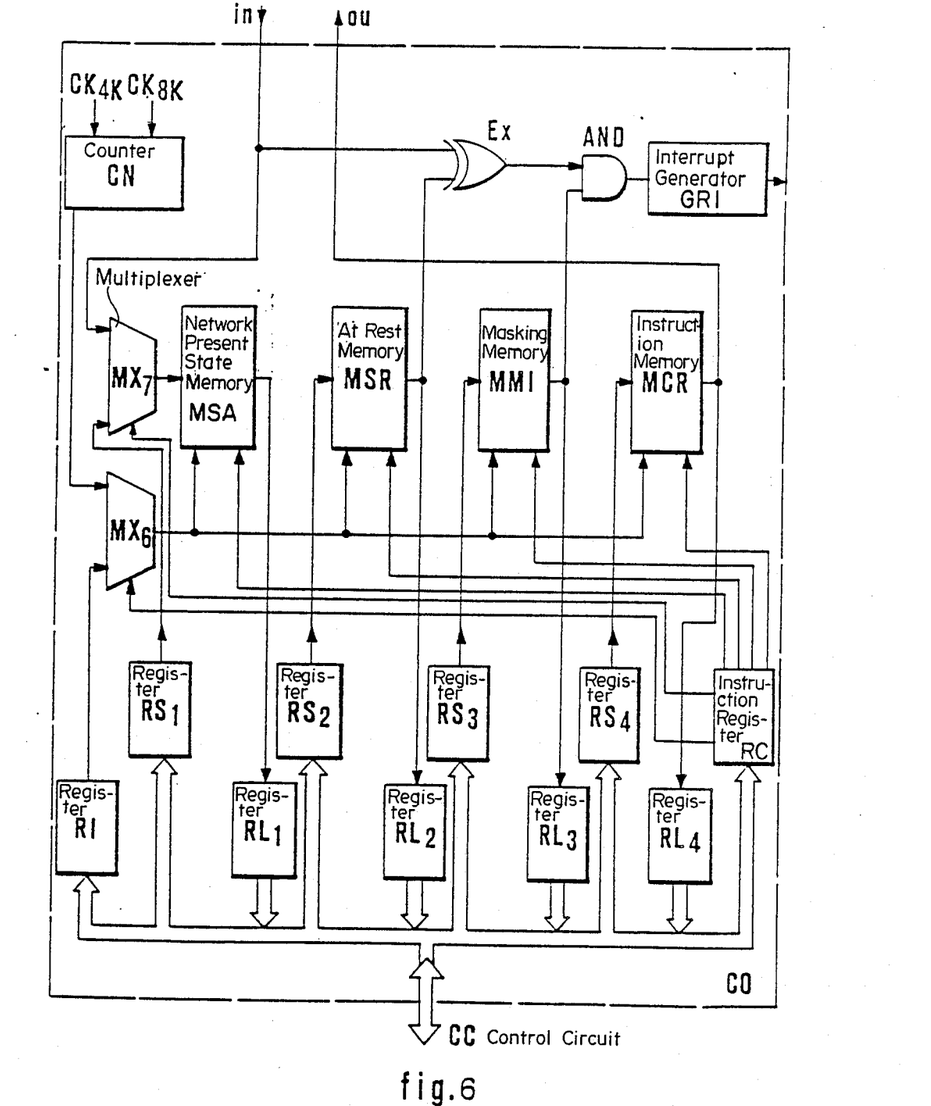
FIG. 6 illustrates the CO unit shown in FIG. 3.

FIG. 6 illustrates in detail the CO unit shown in FIG. 3 to to t bus of the control circuit, CO an input wire in and an output wire ou are each connected the CO unit. It must be borne in mind that in FIG. 3 the B-IN units have been shown as being separate from the B-OU units for clarity; in actual fact, in a preferred embodiment, there is a B-IN unit and a corresponding B-OU unit mounted on the same plate, and consequently, the signals (e.g. id, $ov_1$, $ov_2$, etc.) which are to be sent to the CO unit are all conveyed onto the in wire, whilst the signals output from the CO unit are conveyed onto the ou wire.

In detail, each of the h B units has access to the in wire on a time division basis and transfers a digital word wherein each bit expresses the logical level that the signals described above have in the instant being considered.

The CO unit includes the presence in combination of the following characteristic elements:

a network present state memory MSA, comprising h memory zones, which memorizes the state of each single unit of the network in the instant under consideration;

a network at rest state memory MSR, comprising h memory zones, which memorizes the state that the single units of the network must have in the absence of abnormal operating conditions;

an interrupt masking memory MMI, comprising h memory zones, the function of which is to determine masking of the interrupt requests after they have been picked up by the CC unit;

a network instructions memory MCR, comprising h memory zones, for receiving the instructions to be sent to the single units of the network by means of the ou wire;

a multiplexer $MX_6$ which outputs a binary pattern for addressing the memories described above;

a multiplexer $MX_7$ which has its output connected to the input of the present state memory MSA;

a counter CN the outputs of which are connected to an input of the $MX_6$ multiplexer;

an address register RI the inputs of which are connected to the bus of the CC unit and the ouptus of which are connected to the other input of the $MX_6$ multiplexer;

an instruction register RC, with its input connected to the bus of the CC unit, for receiving and decoding the instructions output by the CC unit and destined to the said memories as well as to the said $MX_6$ and $MX_7$ multiplexers;

writing circuits (schematically illustrated by registers $RS_1$, $RS_2$, $RS_3$ and $RS_4$) which have their inputs connected to the bus of the CC unit and their outputs connected respectively to the inputs of the $MX_7$ multiplexer, of the network at rest state memory, of the interrupt masking memory, of the network instructions memory;

reading circuits (schematically illustrated by registers $RL_1$, $R_2$, $RL_3$ and $RL_4$), which have their outputs connected to the bus of the CC unit and likewise their inputs connected respectively to the output of the network present state memory, the output of the network at rest state memory, the output of the interrupt masking memory, the output of the network instructions memory;

and exclusive OR circuit EX to receive on its input the in wire as well as the output of the network at rest state memory;

a logical product circuit AND, to receive on its input the output of the EX circuit as well as the output of the interrupt masking memory;

an interrupt generator GRI connected to the output of the AND unit.

Operation of the circuitial structure mentioned above can be described as follows:

(a) digital words expressing the state of the single units of the switched network in the instant being considered, reach the MSA memory by means of the $MX_7$ multiplexer. Said words are written in the h memory zones, at the address specified by the binary pattern corresponding to the output of the CN unit: said addresses are scanned in a sequential manner and scannings follow one another with a predetermined cyclicity of duration;

(b) said digital words are also compared, by means of the EX unit, with the contents of the MSR unit which defines the pattern that the said words should have in the absence of abnormal operating conditions;

(c) if the EX unit picks up a lack of identity, it activates its own output thus determining the sending of an interrupt request by the GRI unit;

(d) after the CC unit has picked up said request, it determines masking of it—by means of the MMI unit which disenables the AND unit each time the EX unit represents the abnormal condition that has determined the sending of the interrupt request as described above—and starts a reading operation by the MSA unit in order to pick out the unit to which the abnormal state refers;

(e) after a reading operation by the MSA unit and/or other events—such as for example the intervention of an operator—the CC unit sends predetermined instructions to the units of the message switching network by means of the MCR memory and the ou wire (e.g.: indicators of the fact that the message is to be sent to a predetermined number of modules, as previously specified with reference to the $CR_4$ unit in FIG. 5).

For maintenance purposes the CC unit has the possibility of writing control words in the MSA, MSR, MMI and MCR memories and—after having read the same—of gathering useful information regards their operation. In order to carry out said operation, the CC unit carries out the following operations:

it supplies the RI register with the address of the memory location where a data write operation is to be carried out;

it supplies the instruction register RC with a digital word structured in such a manner that the multiplexers $MX_6$ and $MX_7$ output the contents of the RI register and of the $RS_1$ register respectively;

it supplies the registers $RS_1, \ldots, RS_4$ with digital words to write in their respective memories, which receive a write instruction from the RC register;

after the writing cycle has been complete, it starts off the reading cycle by forwarding the address of the memory cells being used in the operation to the RI register, by forwarding a read instruction to the RC register and by gathering the digital words from the $RL_1, \ldots, RL_4$ registers emptied into them by their respective memories.

The network according to the invention satisfies the requisites announced at the beginning of this text in as much as it can:

(a) switch messages with a number of bytes that may differ from message to message thanks to the use of said message present signal ms;

(b) avoid the danger of there being a loss of messages thanks to the presence of the $CF_1$ and $CF_2$ units which pick up the existence of overflow states thus allowing, in this manner, the supervisor module to activate predetermined functions (e.g. in the presence of the $ov_1$ state the supervisor module inhibits the sending of further messages by the module connected to the B-IN unit to which the $ov_1$ refers). On the other hand, in the presence of an $ov_2$ state the supervisor module inhibits advancement of the scanner SC for a predetermined time interval, thus preventing other B-IN units from sending messages to the B-OU unit—to which the $ov_2$ refers—and consequently allowing elimination of the messages accumulated in the $MB_2$ unit;

(c) synchronize the outputting module and the destination (receiving) module with one another thanks to the presence of the said UT unit which sends the CK clock to the MI-MU, MC, MS modules;

(d) permit the sending of a message to a single destination module as also to a group of modules thanks to the presence of said recognition circuits $CR_2$, $CR_3$ and $CR_4$;

(e) guarantee scanning of all the modules in a predetermined time interval thanks to the fact that the input interface units B-In send a single message at a time to the output interface units B-OU. Thanks to the characteristic in question it is possible to gurantee a more or less constant MDM unit crossing time by the messages that reach the B-IN interface units.

(f) carry out useful functions for diagnosis of the message switching network and connected organs, thanks to the presence of the recognition circuit $CR_1$ (which makes the idle signal id and the loop signal lo available), of the multiplexer $MX_3$ (it allows carrying out of a loop operation) and of the supervisor units MS and C-CRC (they permit verification of the state of all the B-IN units).

I claim:

1. A message switching network for switching messages between a plurality of processing units comprising:

a plurality of input interface units;

a multiplexer which can be driven by scanning means, and which have inputs connected to outputs of the respective said input interface units, a plurality of parallel output interface units which have inputs connected to outputs of the multiplexes;

each of said plurality of input interface units connected to a channel output from a respective processing unit in order to memorize a predetermined number of messages, and to activate a first output after memorizing at least one message so that an access request can be made to a common bus, to make an active signal available on a second output for the complete duration of a message, excepting during a last byte of the message when the signal is deactivated, and to output a message on a third output in reply to receiving an enabling signal;

the multiplexer having inputs for receiving a first output, a second output and a third output of each of said input interface units, and operatively connecting the outputs of the input interface unit to first, second and third outputs of the multiplexer on the basis of address bits applied to their own monitoring inputs;

said scanning means forwarding said address bits to said multiplexer to stop, or begin scanning operations again, in reply to picking up an activation of said first output, or alternatively in reply to picking up a deactivation of a second output, of said multiplexer; said address bits transmitted to decoding means for providing said input interface units with enabling signals; and each output interface unit adapted to be connected to a channel entering its respective processing unit to receive the messages corresponding to the third output of the multiplexing means and also adapted to memorize them if an indicator present in a predetermined byte of the message coincides with an indicator assigned to said output interface unit.

2. A network according to claim 1 further including supervision means;

at least one of the said processing units forming a processor of said supervision means, said supervision means further including a monitoring circuit responsive to input signals indicating the state of a single network unit, and to compare said signals with reference signals, to output an interrupt request towards a relevant processing unit, to activate predetermined functions in the output interface units.

3. A message switching network according to claim 2 in which said processing units are part of a digital type telephone exchange which includes a connection network structured on plural levels for switching vocal and/or data signals; and wherein at least one of said plurality of processing units constitute a processor associated with a switching module while the remaining processing units constitute processors encased in the input-output units of a telephone exchange.

4. A network according to claim 1, wherein each of said plurality of input interface units comprises:

a first recognition circuit, connected to said channel, adapted to make an active signal available on a first output of the recognition circuit for the whole duration of the message excepting only the last byte of the message; a signal available on a second output of the recognition circuit in reply to recognition of the idle state of a transmission channel; a signal available on a third output of the recognition circuit in reply to recognition of a loop instruction situated in a predetermined byte of the message;

a first serial-to-parallel convertor connected to the transmission channel;

a first buffer memory connected to the outputs of a serial-to-parallel convertor and to a first and third outputs of a first recognition circuit;

a first write counter actuated by the active signal available on the first output of the recognition circuit and adapted to advance by a clock signal with a frequency k less than the transmission speed of messages that reach the first serial-to-parallel convertor, k being the number of bits foreseen in each byte of the message;

a message counter, adapted to increase its own contents by one step ahead in reply to picking up each active signal available on the first output of the first recognition circuit, and also adapted to decrease its own content by one step in reply to receiving an enabling signal supplied by the scanning means and further adapted to activate one of its own outputs if its own content is other than zero;

a first read counter adapted to advance in response to a clock signal when the enabling signal is active, where the clock signal has a frequency less than the speed of the messages that transmit on said first output of the multiplexing means;

a second multiplexer, adapted to send the outputs of the said first write counter, according to the logical level of a signal applied to a monitoring input of its own to the said first buffer memory;

a first comparison circuit adapted to activate one of its own outputs when the contents of the first write counter differ from the contents of the first read counter by a predetermined entity; and a first parallel-to-serial convertor connected by its output to the first buffer memory.

5. A network according to claim 1 wherein each of the said output interface units includes;

second serial-to-parallel converter adapted to receive on its inputs the messages available on the third output of the multiplexer;

a second, third and fourth recognition circuits adapted to activate their own outputs if they pick up a coincidence between an indicator associated and sent to them and an indicator specified in a predetermined byte of the messages input to them;

a logical sum circuit connected to the output of said second, third and fourth recognition circuits;

a second write counter actuated by the signal available on a second output of the multiplexer and capable of advancing in response to a clock signal;

a second buffer memory adapted to memorize the bits available on the outputs of the second serial-to-parallel convertor as well as said signal, at the address supplied by said second write counter, when the output of said logical sum circuit is active;

said parallel-to-serial convertor adapted to receive the outputs of said buffer memory in its inputs;

a second read counter actuated by a signal supplied by a microprogrammed memory and advanced by a clock signal;

a fourth multiplexer adapted to send the outputs of the write counter or of the second read counter according to the logical level of a signal applied to its own monitoring input, to the said second buffer memory;

a second comparison circuit for actuating first output or second output when the contends of the second read counter differs by a predetermined entity or coincides;

a microprogrammed memory adapted to have input into it a second output of the second comparison circuit, predetermined instructions of a supervisor means, as well as an output of the second buffer memory, and to also make available on its outputs an enabling signal of the second read counter;

monitoring signals for a fifth multiplexer as well as a flag start signal to synchronize a signal generator;

a signal generator adapted to make available on a first output synchronized by said flag start signal, or on a second output, binary patterns that coincide with said flag signal, or alternatively with idle signals; and a fifth multiplexer adapted to have the output of a second parallel-to-serial convertor input into it, as well as the first and second outputs of said signal generator, and to have the outputs of said microprogrammed memory input to its monitoring input.

6. A network according to claim 2 wherein said monitoring circuit includes;

a network present state memory, including a plural memory zones, adapted to memorize the state of signal units of the network;

a network at rest state memory, including plural memory zones, adapted to memorize the state that the signal units of the network must have in the absence of abnormal operating conditions;

an interrupt masking memory, including plural memory zones, which are adapted to determine masking of the interrupt request after they have been picked up by a relevant processing unit;

a network instructions memory, including plural memory zones, for receiving the instructions to be sent to signal units of the network by means of an output wire of the supervisor means;

a sixth multiplexer which outputs a binary pattern for addressing said memories;

a seventh multiplexer which has its output connected to the input of the present state memory;

a counter, the outputs of which are connected to an input of the sixth multiplexer;

an address register the inputs of which are connected to a bus of a relevant processing unit and the outputs of which are connected to the inputs of the sixth multiplexer;

an instruction register, for receiving and decoding the instructions output by the relevant processing unit and directed to said memories as well as to the said sixth and seventh multiplexers;

writing circuits which have inputs connected to the bus of a relevant processing unit and outputs connected respectively to the inputs of the seventh multiplexer, of the network at rest state memory, of the interrupt masking memory, of the network instructions memory;

reading circuits, which have their outputs connected to the bus of a relevant processing unit and also their inputs connected respectively to the output of the network present state memory, the output of the network at rest state memory, the output of the interrupt masking memory, the output of the network instructions memory;

an exclusive OR circuit adapted to receive on its input signals indicating the state of the signal units of the network as well as the output of the network at rest state memory;

a logical product circuit, adapted to receive on its input the output of the exclusive OR circuit as well as the output of the interrupt masking memory; and an interrupt generator connected to an output of the logical product circuit.

7. A network according to claim 5 wherein said output interface units include a third multiplexer adapted to send the messages available on the third output of the multiplexer or alternatively the messages available on the output of an input interface unit associated to said output interface units, to the second serial-to-parallel convertor, according to the logical level of a bit available on the output of the first buffer memory.

8. A network according to claim 1 further including a timing means for supplying clock signals both to said processing units and to signal messages operatively associated with the message switching unit.

9. A network according to any one of the preceding claims in that said messages have a field in which a code for revealing errors has been inserted and further including an error revealing circuit which has its input connected to the first and second output of the first multiplexing means and its output connected to a input wired of a supervisor means.

* * * * *